United States Patent
Brodeur, Jr. et al.

[19]

[11] Patent Number: 6,162,309
[45] Date of Patent: Dec. 19, 2000

[54] REINFORCED FOAM BACKED CARPET

[75] Inventors: Edouard A. Brodeur, Jr., Marietta, Ga.; Joseph W. Wilson, Buena Vista, Va.

[73] Assignee: Burlington Industries, Inc., Greensboro, N.C.

[21] Appl. No.: 09/063,377

[22] Filed: Apr. 21, 1998

[51] Int. Cl.[7] .............................. B32B 3/10; B32B 31/06; B32B 31/08

[52] U.S. Cl. ............................ 156/72; 156/327; 428/95; 428/97

[58] Field of Search .................... 156/72, 182, 327; 428/95, 97

[56]  References Cited

U.S. PATENT DOCUMENTS

| | | |
|---|---|---|
| 1,594,261 | 7/1926 | Herschmann . |
| 2,776,233 | 1/1957 | Roberts . |
| 2,856,323 | 10/1958 | Gordon . |
| 2,950,221 | 8/1960 | Bauer et al. . |
| 3,014,829 | 12/1961 | Curtin . |
| 3,264,167 | 8/1966 | Sands . |
| 3,281,258 | 10/1966 | Callahan . |
| 3,309,259 | 3/1967 | Schwartz . |
| 3,518,102 | 6/1970 | Mertgen et al. . |
| 3,560,284 | 2/1971 | Wisotzky et al. . |
| 3,586,598 | 6/1971 | Beemer . |
| 3,695,987 | 10/1972 | Wisotzky et al. . |
| 3,945,955 | 3/1976 | Ihde, Jr. ......................... 260/2.5 P |
| 4,018,957 | 4/1977 | Werner et al. ..................... 428/141 |
| 4,075,377 | 2/1978 | Aitchison et al. . |
| 4,144,371 | 3/1979 | Okie et al. . |
| 4,234,649 | 11/1980 | Ward . |
| 4,242,389 | 12/1980 | Howell . |
| 4,405,668 | 9/1983 | Wald . |
| 4,504,537 | 3/1985 | Mussallem, Jr. . |
| 4,504,538 | 3/1985 | Mussalem, Jr. . |
| 4,535,021 | 8/1985 | Friedrich . |
| 4,557,774 | 12/1985 | Hoopengardner . |
| 4,988,551 | 1/1991 | Zegler . |
| 4,990,399 | 2/1991 | Hoopengardner . |
| 5,019,194 | 5/1991 | Friedrich . |
| 5,082,705 | 1/1992 | Rose . |

(List continued on next page.)

FOREIGN PATENT DOCUMENTS

| | | |
|---|---|---|
| 761157 | 6/1967 | Canada . |
| 0192403 | 8/1986 | European Pat. Off. . |
| 1569704 | 6/1980 | United Kingdom . |

(List continued on next page.)

OTHER PUBLICATIONS

Flooring Magazine, Oct., 1994 issue, p. 58 "Non–Slip Rug Treatment" article, Leo Douglas Publications, Inc. Griptex Industries Products.

Vantage Industries, Atlanta, Georgia, brochures for "Rug Saver" and "Sultan", admitted prior art.

Abstract (Basic): NL 6611805 A.

Abstract (Basic): JP 73040051 B.

*Primary Examiner*—Sam Chuan Yao
*Attorney, Agent, or Firm*—Nixon & Vanderhye P.C.

[57]  ABSTRACT

A carpet in tile or roll form is produced using an open mesh reinforced foam layer with foam nodules. The carpet is produced having a primary backing through which carpet fiber bundles are tufted and a precoat layer which locks the tufts in place to prevent easy extraction of the fibers so that a tufted face and a relatively smooth back face are provided. The foam layer with foam nodules is brought into intimate contact with the relatively smooth back face, and is substantially permanently adhered to it producing a carpet tile or roll that is substantially prevented from curling or doming (or they are significantly reduced) and may be installed without adhesive if desired. Adhering may be practiced by using a non-fused adhesive formulation which is subsequently fused at a low temperature (about 310° F. or less), or by forcing the foam layer with foam nodules into contact with the carpet back while the hot melt backing is still in a fluid form, or by use of a thermoplastic layer between the carpet and foam sheet.

20 Claims, 4 Drawing Sheets

U.S. PATENT DOCUMENTS

| | | |
|---|---|---|
| 5,120,587 | 6/1992 | McDormott, III et al. . |
| 5,352,158 | 10/1994 | Brodeur, Jr. .............................. 472/92 |
| 5,567,497 | 10/1996 | Zegler et al. . |
| 5,707,903 | 1/1998 | Schottenfeld . |

FOREIGN PATENT DOCUMENTS

| | | |
|---|---|---|
| 97/24226 | 7/1907 | WIPO . |
| 0712944 | 5/1996 | WIPO . |
| PCT/US96/ 20448 | 10/1997 | WIPO . |

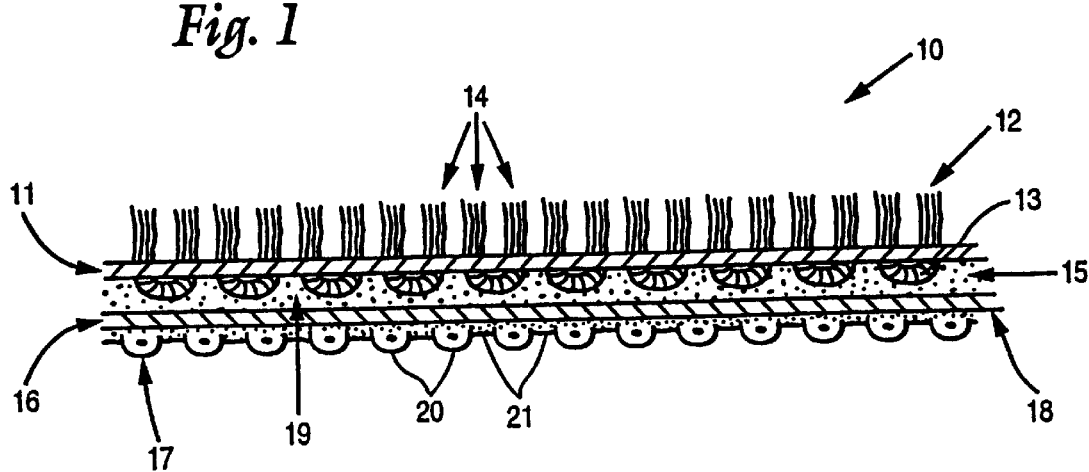
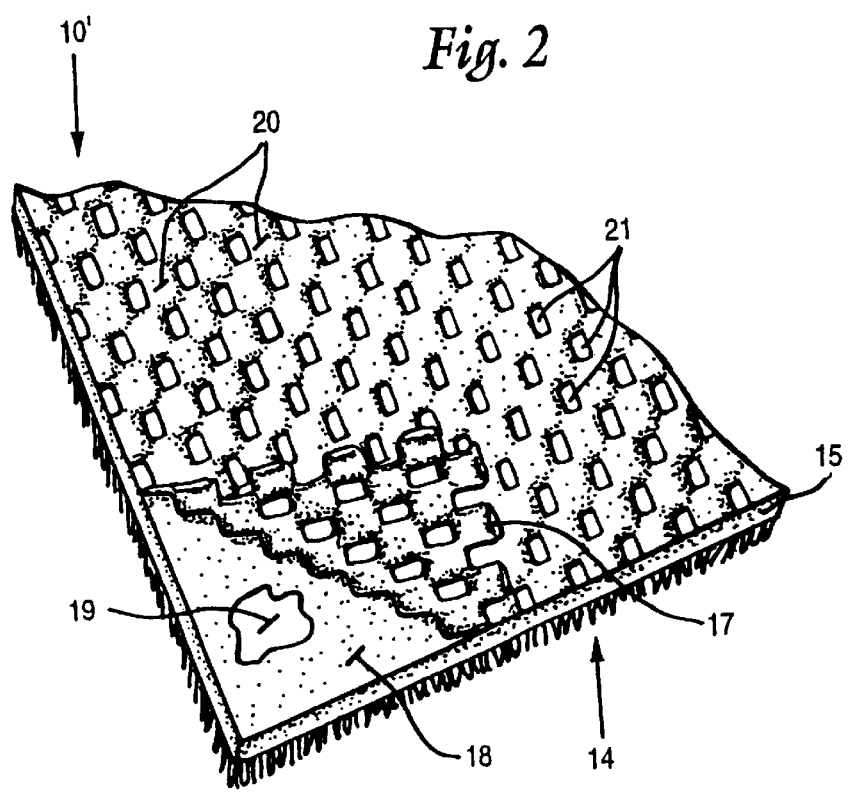

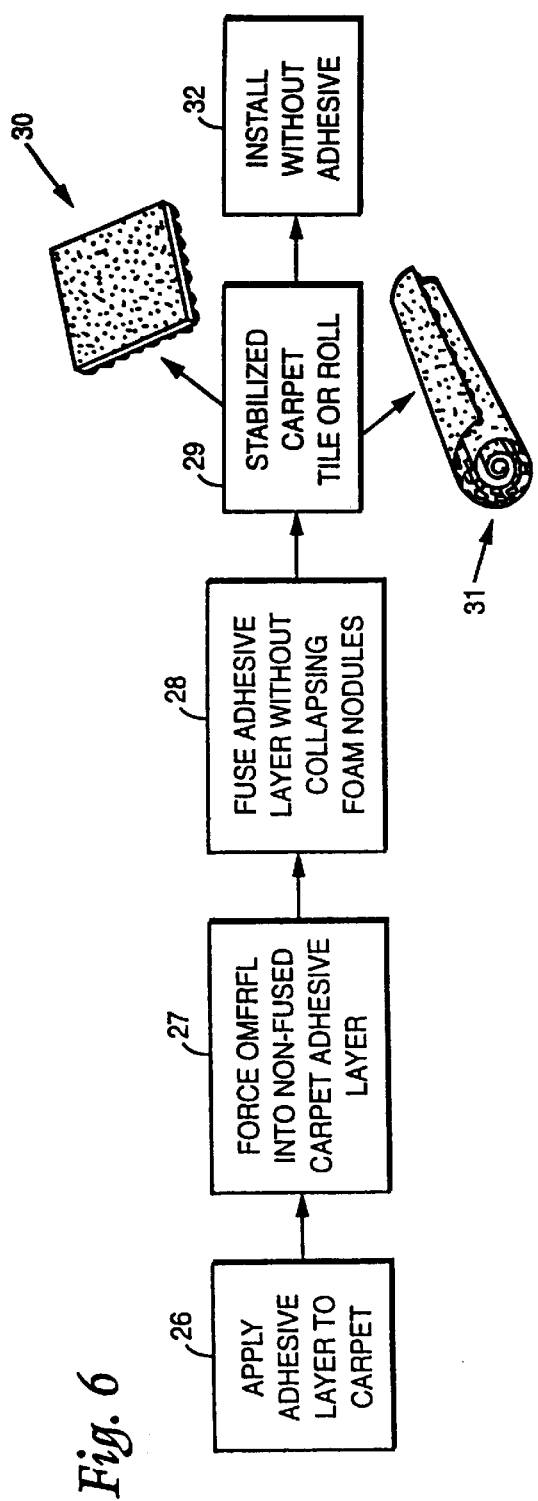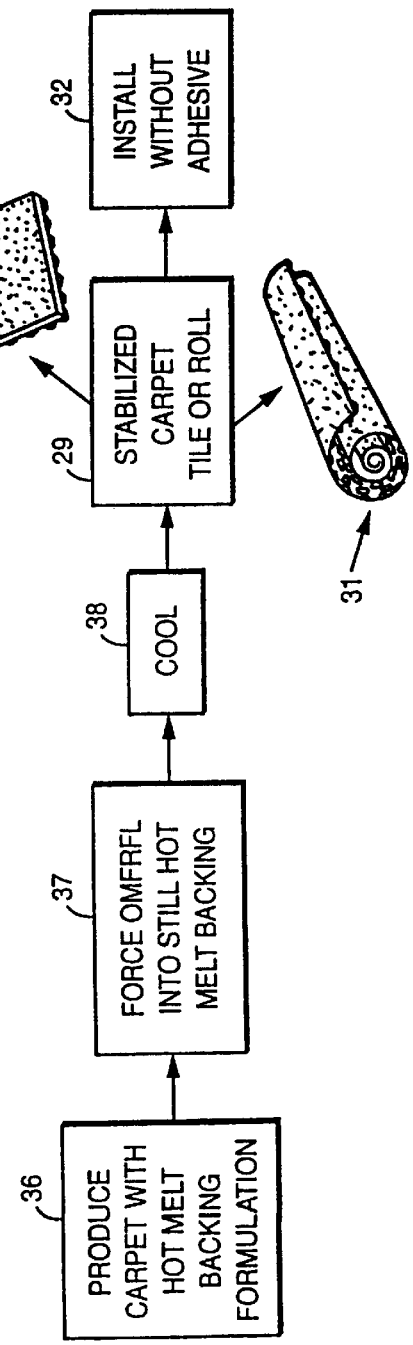

REINFORCED FOAM BACKED CARPET

BACKGROUND AND SUMMARY OF THE INVENTION

Commercial foamed back carpet, carpet modules, and carpet tiles are commonly produced by laminating a pre-formed chemically blown foam of the proper thickness and density to a pre-coated carpet. This is commonly done by heating the pre-coated carpet and the preformed closed cell foam to the hot melt phase of the polyvinyl chloride and pressing the two layers together. Other variations of this method, some of which involve adhesives, are common. Most of these involve heating of the preformed closed cell foam.

Heating of chemically blown closed cell foam always results in the expansion of the closed cells with a corresponding growth in the dimensions of this layer. In the case of tufted and back coated carpet, the thermal expansion of the solid elastomeric back coats the fibrous primary backings into which the carpet yarn is tufted. The thermal expansion of this composite is much less than the expansion of the gas filled cells of the foam layer. In the case of carpet formed by implanting fibers in an elastomeric layer to which the preformed foam layer is subsequently laminated, the same differential expansion and contraction factors occur. This style is referred to as Fusion Bonded Carpet. When an expanded layer is laminated in the presence of heat to another less expanded layer, tension forces develop upon cooling. These forces result in a latent tendency of the product to curl and/or dome. The foam layer wants to pull in under the product. In the case of carpet tiles, the tiles from the center of the composite will dome differently from side to side.

Also in the case of carpet or tiles produced by this method, the relatively smooth under surface of the carpet or tile does not allow substrate moisture or hydrostatic pressure to dissipate, resulting in condensation of the vapors under the carpet or the tile. In addition, it is known that the stabilization of dimensions in such a product requires several reinforcing fleeces or scrims. The processes described do not lend themselves to the incorporation of several fleeces or scrims.

In the existing art, the foam layer is formed by a layer of polyvinyl chloride (PVC) plastisol (dispersion of PVC resin in plasticizer) on an impervious carrier, such as but not limited to, a stainless steel belt or a Teflon® coated wire or fiberglass belt, and expanding the layer from a density of 70 to 90 pounds per cubic foot down to 15 to 25 pounds per cubic foot. A general formulation for such a foam layer is:

|  | PARTS |
| --- | --- |
| PVC resin (K value 62 to 70) | 100 |
| Plasticizer (Di Octyl Phthalate) | 60 to 100 |
| Nitrogen producing agent (Azo Di Carbonamide) | 3 |
| Blow promoter (Zinc Octoate) | 1 |
| Filler (Calcium Carbonate) | 0 to 150 |
| Color | as needed |

"K" value is a universal method of indicating the molecular weight of the PVC molecule.

After casting the formulation on the carrier belt, the PVC plastisol is heated until the material reaches 370 to 380° F., converting all the blowing agent to gaseous nitrogen.

According to the present invention the problems with curling or doming that occur in the commercial prior art are substantially eliminated, and the disadvantageous condensation of vapors under the carpet of the tile is also substantially eliminated. The carpet tile or roll that is produced according to the present invention has a backing that is non-slip, so that if desired the carpet tiles or roll may be installed without adhesive, namely with conventional tacking of the carpet roll or tile at the perimeter portions, or utilizing like conventional techniques. The OMFRFL can also be adhered/applied using a thermoplastic material such as polypropylene, polyethylene, or other thermoplastic compound.

According to the invention, an open mesh fiber reinforced foam layer ("OMFRFL") is incorporated onto or with the back of a back coated carpet, or fusion bonded carpet. The stable construction of the finished product is the result of the addition of a scrim in the open mesh foam as well as the open nature of that layer. This fiber mesh reinforcement can be either a second or a third fiber layer. It is a third fiber layer if the open mesh scrim foam is installed after a second layer of fleece of scrim, woven or non-woven, is adhered to the back coated or fusion bonded carpet. The OMFRFL is applied either with a foamed or non-foamed adhesive system that can be solid, frothed, or latex applied and heated to cure or fuse the adhesive. The temperature needed to accomplish this (less than about 310° F.) will not significantly expand the reinforced open mesh foam across the width or in the lengthwise direction of the product any more than the carpet to which it is being bonded. The OMFRFL can also be applied using a thermoplastic hot melt material such as amorphous polypropylene, or polyethylene that is viscous when hot and rubbery when cooled. All the expansion and subsequent contraction of the foam will be in a vertical direction to the plane of the carpet. The resulting foam backed carpet or tile allows air and hydrostatic or gas pressure to dissipate, reducing the trapped vapor's tendency to condense under the carpet, thus conditions for mold and mildew formation are reduced.

According to one aspect of the present invention a method of producing a carpet in tile or roll form using an OMFRFL with foam nodules is provided. The method comprises the steps of: (a) Producing a carpet in tile or roll form having a primary backing through which carpet fiber bundles are tufted and a precoat locking the tufts in place to prevent easy extraction of individual fibers, so that a tufted fiber face and relatively smooth opposite back face are provided. (b) Bringing the open mesh fiber reinforced foam layer with foam nodules into intimate contact with the relatively smooth back face, And (c) substantially permanently adhering the open mesh fiber reinforced foam layer with foam nodules in contact with the relatively smooth back face to provide a carpet tile or roll that has reduced curling or doming and/or that is substantially prevented from curling or doming and may be installed with or without adhesive.

There are two alternative manners in which the method steps (b) and (c) may be carried out. According to one aspect of the method, a preformed back or precoated carpet has a non-fused adhesive system associated therewith, onto which the OMFRFL is formed, with subsequent fusing; or according to another aspect, while the vinyl backing of the carpet roll or tile still has hot melt properties as it emerges from the final fusion oven, the OMFRFL is forced into intimate contact therewith.

That is, according to the first aspect of the method of the invention, step (c) is practiced by applying a non-fused adhesive formulation to the relatively smooth back face, and then after step (b), fusing the adhesive at a temperature low enough (e.g. a maximum fusing temperature of 310° F., preferably a maximum temperature of about 300° F.) to prevent the collapse of the preformed foam nodules of the open mesh fiber reinforced foam layer. Step (c) is further practiced by applying as the adhesive formulation a formulation comprising, or consisting essentially of:

| PVC Copolymer | 100 parts |
|---|---|
| Plasticizer | 50–100 parts |
| Filler | 0–200 parts |
| Silicone surfactant | 0–4 parts |
| Fumed silica | 0–2 parts. |

Preferably step (c) is further practiced by applying as the adhesive formulation about 25–150 parts filler, sufficient silicone surfactant to provide a formulation density below 50 pounds per cubic foot, and sufficient fumed silica to provide a formulation Brookfield viscosity of about 30,000–60,000 centipoise at a spindle speed of 2 rpm.

In practice of the second aspect of the method of the invention, step (c) is practiced by practicing step (a) using a fusion oven, and so that the relatively smooth carpet back face has hot melt properties as it emerges from the fusion oven; and step (b) is practiced by forcing the open mesh fiber reinforced foam layer with foam nodules into intimate contact with the relatively smooth back face so that the back face contacts, or at least partially envelops, the foam nodules to provide a substantially instant bond. Step (c) may be further practiced by providing as at least part of the carpet back, contacting the OMFRFL, a formulation comprising (or consisting essentially of):

| PVC resin with a K value of 62–75 | 100 parts |
|---|---|
| Plasticizer | 60–100 parts |
| Filler | 0–250 parts | and substantially devoid of blowing agent (preferably having no more than trace amounts). There is also the further step of cooling the carpet with OMFRFL with foam nodules backing, which cooling takes place during normal processing.

In both aspects of the method of the invention, step (a) may be further practiced to provide a reinforcing scrim (as is conventional for carpet tiles) as part of the carpet adjacent the relatively smooth back face, the scrim typically being a fleece, woven, or non-woven in construction as is conventional. Also, in both aspects of the method, step (b) may be practiced utilizing rollers which engage the tufted face of the carpet roll or tile, and the face of the OMFRFL opposite the carpet tile or roll, and squeezing them together with pressure that is adjusted depending upon the details of the materials used so that the appropriate intimate contact is reached without squeezing necessary somewhat fluid materials out of the nip area of the rollers. Other conventional equipment aside from the rollers may also be used for this purpose, including converging conveyor belts, relatively low friction surfaces, combinations thereof, or the like.

According to another aspect of the present invention a carpet roll or tile is provided comprising the following components: A primary backing having carpet fiber bundles tufted therethrough, the fibers bundles providing a tufted face. A precoat locking the tufts in place to prevent easy extraction of individual fibers and providing a relatively smooth back face opposite the tufted face. And an open mesh fiber reinforced foam layer with foam nodules held in substantially intimate contact with the relatively smooth back face.

The OMFRFL with foam nodules is preferably held in substantially intimate contact with the relatively smooth back face by a fused adhesive, such as an adhesive having a formulation comprising or consisting essentially of:

| PVC Copolymer | 100 parts |
|---|---|
| Plasticizer | 50–100 parts |
| Filler | 0–200 parts | a sufficient amount of silicone surfactant to provide a formulation density below 50 pounds per cubic foot, and a sufficient amount of fumed silica to provide a formulation pre-fusing Brookfield viscosity of about 30,000–60,000 centipoise at a spindle speed of 2 rpm.

Alternatively, the OMFRFL with foam nodules may be held in substantially intimate contact with the relatively smooth back face by a hot melt formulation of the back face comprising or consisting essentially of:

| PVC resin with a K value of 62–75 | 100 parts |
|---|---|
| Plasticizer | 60–100 parts |
| Filler | 0–250 parts | and substantially devoid of blowing agent. The hot melt formulation is not limited to PVC, but can also be any thermoplastic material that acts as a flexible layer or adhesive.

The hot melt formulation is not limited to PVC but can also be any thermoplastic material that acts as a flexible layer or adhesive.

According to another aspect of the present invention a carpet tile is provided. The carpet tile is substantially the same as the carpet roll as described above, except that it additionally includes a reinforcing scrim adjacent the relatively smooth back face and held in place at least in part by the precoat. Under some circumstances the carpet roll may also have a reinforcing scrim. Also, according to the invention carpet rolls or tiles may be made by practicing the method steps described above with respect to the method aspect of the invention.

It is a primary object of the present invention to provide a carpet in tile or roll form having at least some of the following advantages; it is substantially prevented from curling or doming, has enhanced antagonistic conditions to mold and mildew formation, and may even be installed without adhesive if desired. This and other objects of the invention will become clear from an inspection of the detailed description of the invention, and from the appended claims.

BRIEF DESCRIPTION OF THE DRAWINGS

FIG. 1 is a side cross sectional schematic view of an exemplary carpet tile or roll according to the invention, which includes a reinforcing scrim;

FIG. 2 is a bottom perspective view of an exemplary carpet tile or roll according to the present invention with a portion of the open mesh fiber reinforced layer peeled away for clarity of illustration, and without the reinforcing scrim of the FIG. 1 embodiment;

FIG. 6 is a diagrammatic view showing basic method steps that may be practiced according to one aspect of the method of the present invention; and FIG. 7 is like FIG. 6 only for a second embodiment of an exemplary method according to the present invention.

DETAILED DESCRIPTION OF THE DRAWINGS

Figure 3:
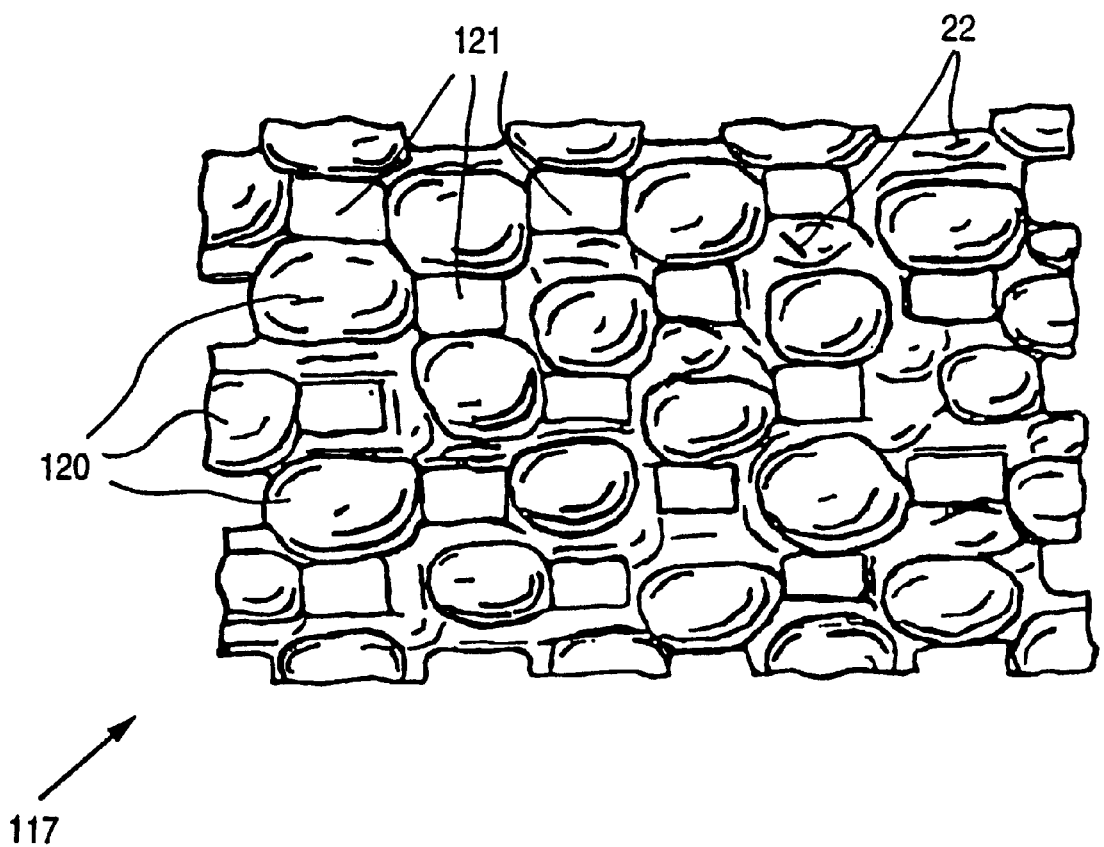
FIGS. 3 through 5 are top schematic plan views of alternative configurations of open mesh reinforced fiber foam layers with foam nodules that may be utilized with the carpet roll or tile of FIGS. 1 or 2, according to the invention.

FIG. 1 schematically illustrates in cross section an exemplary carpet according to the invention. The carpet 10 illustrated in FIG. 1 may either be in tile (module) or roll form, although the particular version illustrated in FIG. 1 is more commonly in tile form. It includes a primary backing 11 of conventional construction, such as a woven or nonwoven fabric composed of natural or synthetic fibers or combinations thereof, commonly used such fibers being jute, polypropylene, polyester, and nylon, with or without some glass fibers. Tufted through the primary backing 11 are the carpet fiber bundles 12 which are typically in a closed loop configuration or in a cut pile configuration, as illustrated in FIG. 1 which shows the bottom portion of the cut pile at 13 beneath the primary backing 11, and an open configuration on the opposite side of the primary backing 11, defining a cut pile tufted face 14. The fibers of the fiber bundles 12 may be of any conventional construction used for carpets, such as nylon, polyester, acrylic, olefins such as polyethylene, or polypropylene, or natural fibers such as cotton or wool.

Locking the tufts 12 in place is a layer of material 15 which is often referred to in the trade as a precoat or first back coat. The precoat 15 is typically an elastomeric or bituminous layer which saturates the loops 13 of the fiber bundles 12 to prevent easy extraction of the individual fiber or the bundles 12 from the carpet 10.

In the embodiment illustrated in FIG. 1, the carpet 10 also includes a reinforcing scrim 16, such as a lightweight fiberglass fleece, or some other woven or non-woven scrim, which is provided for dimensional stability. While the scrim 16 may be used with carpets in roll configuration, it is particularly desirable for carpet tiles and like carpet modules.

According to the present invention, on the opposite side of the precoat 15 on the primary backing 11 is an open mesh fiber reinforced foam layer ("OMFRFL") with foam nodules, illustrated generally at 17 in FIG. 1, which is held in place utilizing a holding system shown only schematically at 18 in FIG. 1. The OMFRFL is adhered to the back face 19, which, in contrast to the tufted face 14, is relatively smooth, and opposite the tufted face 14. Though the back face 19 is relatively smooth (compared to the tufted face 14), it preferably does have surface texturing rather than being completely macroscopically smooth (such as are conventional wood, ceramic, or metal surfaces).

The OMFRFL 17, as seen in both FIGS. 1 and 2, includes foam nodules 20 with openings 21 between the nodules 20. The OMFRFL is a commercially available known construction, which has a plurality of foam shapes of various thicknesses, densities, patterns, or the like and is typically formed by immersing a foam scrim formed of natural of synthetic fibers which are either knitted or woven into a network having intermittent openings spaced along the surface thereof in a repeating pattern. A typical weight is about 0.5–2.5 oz/square foot.

The openings 21 may be randomly spaced and may be rectangular, or have other polygonal shapes, or even circular shapes, or combinations of such shapes. Typically the scrim forming the OMFRFL 17 is dipped in a liquid thermoplastic material such as PVC, excess PVC is removed to leave a combination of heavy and light coatings, and then the structure is cured in an oven. This provides either an orderly or random network of thick and thin areas. In the preferred embodiment gas is released during the curing cycle providing thick and thin areas of foam proportional to the amount of the liquid PVC that is held onto the strands of fibers or trapped in the knotted areas of the scrim construction. One conventional product that may be utilized as the structure 17 according to the present invention is sold by Vantage Industries of Atlanta, Ga., under the trademarks "Rugsaver" and "Sultan". Various configurations of the structure 17 per se are shown in PCT/US96/20448.

FIG. 2 illustrates a carpet tile or roll 10' according to the invention which is substantially the same as the construction 10 in FIG. 1 except that no reinforcing scrim 16 is provided. The element 18 schematically illustrated in FIGS. 1 and 2 may comprise a non-fused adhesive formulation which is subsequently fused in such a manner as to not collapse the preformed foam nodules 20 of the OMFRFL 17, or may be all or part of the precoat 15.

Figure 4:
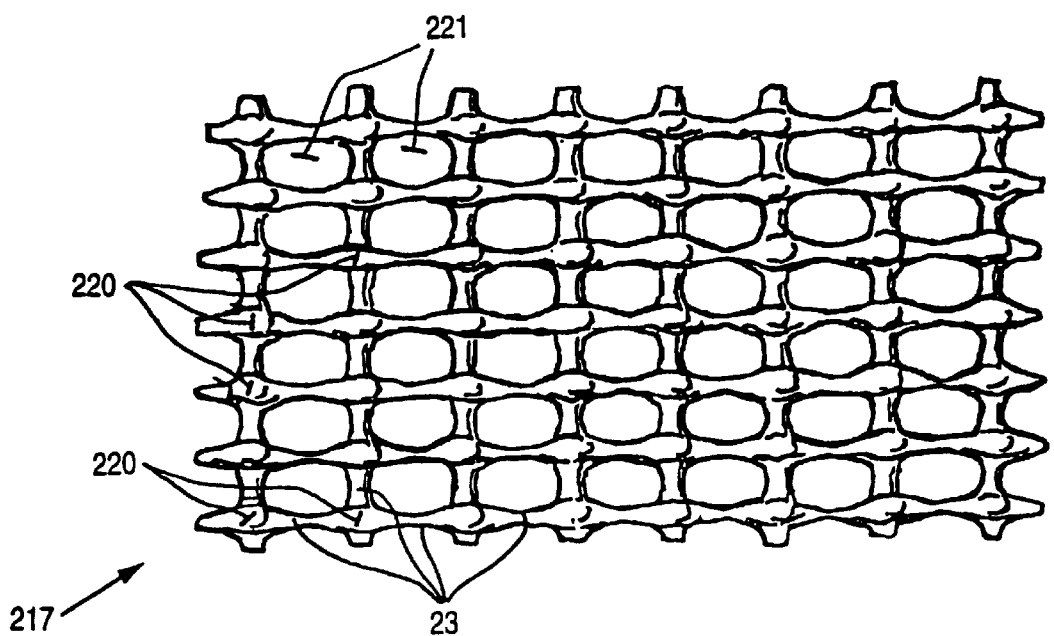
Figure 5:
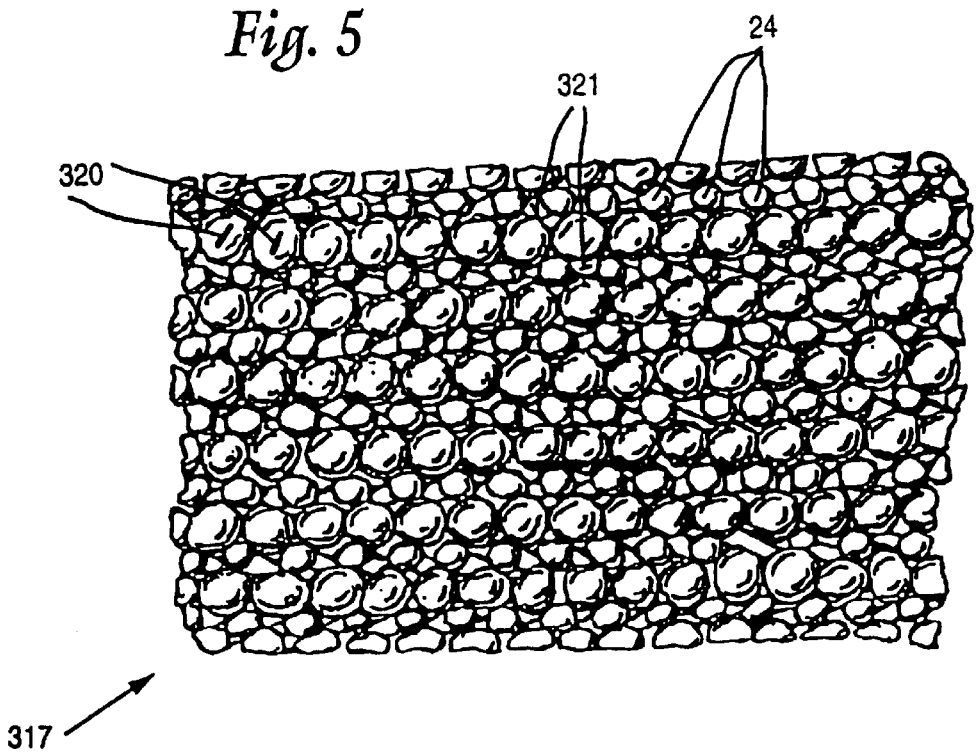

FIGS. 3 through 5 illustrate various other forms that the OMFRFL may take according to the invention. For example, the structure 117 in FIG. 3 includes the foam nodules 120 and the openings (rectangular) 121 between them, and also contains other, non-nodule, material 22 between the nodules 120.

FIG. 4 shows a OMFRFL 217 having nodules 220 and openings 221 with generally fiber-like non-nodule elements 23 interconnecting the nodules 220.

FIG. 5 shows another OMFRFL 317 having nodules 320 and defining openings 321, in this case the openings 321 being small, and there being a number of small nodules 24 between the major nodules 320 helping to define the openings 321. All of the constructions 117, 217, 317 are known per se from PCT/US96/20448, and other variations thereof may also be provided.

FIG. 6 schematically illustrates the basic steps in the practice of one aspect of the method according to the present invention. A back coated carpet, or fusion bonded carpet, is produced using conventional techniques and then, as indicated schematically at 26 in FIG. 6, a thermoplastic adhesive layer is applied to the carpet back face 19. The thermoplastic adhesive may be applied in any suitable conventional manner, such as by coating, spraying, or application to the OMFRFL which then comes into contact with the backing 19. At stage 26 the adhesive (schematically illustrated at 18 in FIGS. 1 and 2) is a non-fused adhesive formulation. The formulation that is preferred comprises or consists essentially of:

|  | PARTS |
| --- | --- |
| Copolymer PVC | 100 |
| Plasticizer | 50 to 100 |
| Filler [e.g. Calcium Carbonate] | 0 to 200 |
| Silicone surfactant | 0 to 4 |
| Fumed Silica | 0 to 2. |

The preferred choice for a PVC resin for this application is a copolymer with preferably about 4 to 5% acetate to minimize the requirement for additional heat above what would be required to fuse the adhesive below 300 to 310° F. Excessive time and heat will collapse the preformed foam.

The fumed silica [e.g. 1–2 parts] is used as needed to produce a viscosity with a high degree of pseudoplasticity as exemplified by a Brookfield viscosity value of 30,000 to 60,000 centipoise at a spindle speed of 2 RPM's [e.g. 1–2 parts].

The plasticizer may be di octyl phthalate (DOP) or another of the many functional plasticizers used in this trade, including but not limited to di hexyl phthalate, butyl benzyl phthalate, plasticizers based on adipic acid, teraphthalic acid, sebacates; azelates, and phosphates.

A silicone surfactant (e.g. Dow Corning 1250, 1–3 parts) is used to reduce the density of the adhesive layer by mechanically frothing the plastisol to densities below 50 pounds per cubic foot.

While calcium carbonate is a preferred filler, there are literally dozens of available fillers that can be used effectively. Typically about 25–150 parts filler are utilized.

The next step of this aspect of the method, illustrated schematically at 27 in FIG. 6, comprises forcing the OMFRFL into the non-fused carpet adhesive layer 18. Step 27 may be accomplished utilizing a pair of rollers forming a nip with one roller engaging the tufted face 14 and the other the nodules 20 of the OMFRFL 17 on the opposite face thereof from the tufted face 14, the rollers applying appropriate pressure to move the OMFRFL 17 into intimate contact with the non-fused thermoplastic, adhesive system 18 while not squeezing out any fluidic materials between the nip. Alternatively, conventional belts, low friction surfaces, or combinations thereof with each other and with rollers, or like conventional structures, may be utilized.

After step 27, as illustrated schematically at 28 in FIG. 6, the adhesive layer 18 is fused without collapsing the foam nodules 20 by applying a temperature significantly lower than the temperature that would collapse the nodules 20. Typically, the maximum fusing temperature at 28 is about 310° F., or about 300° F. Fusing is accomplished by using a conventional fusion oven or the like.

The product produced according to the present invention is a stabilized carpet tile or roll as indicated generally by block 29 in FIG. 6, an, exemplary tile being shown schematically at 30 in FIG. 6, and an exemplary roll shown schematically at 31. The structures 30, 31 are substantially prevented from curling or doming by the structure 17, the antagonistic conditions for the formation of mold and mildew are enhanced, and the structure provides such firm non-stick characteristics that, if desired, tile 30 or roll 31 may be installed without adhesive, as indicated schematically at 32 in FIG. 6. Conventional perimeter installation would still be utilized.

FIG. 7 illustrates an alternative method of producing a carpet tile or roll according to the invention. As indicated at box 36 in FIG. 7, the carpet tile or roll is produced with a hot melt backing formulation. A typical formulation that may be used for this purpose, which comprises completely the precoat 15 or the outwardmost facing portion of the precoat 15, may comprise or consist of:

| | |
|---|---|
| PVC resin, with a K value 62 to 75 | 100 |
| Plasticizer (e.g. DOP) | 60 to 100 |
| Filler (e.g. Calcium Carbonate) | 0 to 250. |

Preferably there is substantially no blowing agent. The extent of penetration of the OMFRFL into the backing is determined by regulating the hot melt properties by a higher or lower K value of the resin. A K value below 65 will produce an extremely soft layer, while K values above 75 will result in a dry film.

As indicated at 37 in FIG. 7, the next step in this aspect of the method is to force the OMFRFL into the still fluid hot melt backing, the forcing being accomplished in the same way as described above with respect to step 28. This forcing action must take place substantially immediately upon emergence of the carpet tile or roll from the final fusion oven so that the hot melt formulation described above still has fluid properties. If desired, and if no scrim 16 is provided, the OMFRFL 17 may be forced so that it actually comes into contact with at least some of the bottom loops 13 of the tufted fiber bundles 14.

After step 38 the carpet 10 or 10' is cooled as indicated at 38 in FIG. 7. Cooling typically can be accomplished merely by normal exposure to the air so that the fluid properties of the hot melt backing (such as the backing portion 18 illustrated in FIGS. 1 and 2) are lost, and the material of the backing solidifies around and envelops and forms an envelope or amalgam with the material of the OMFRFL 17, such as being provided in the openings 21 and engaging a significant portion of the nodules 20. A conventional forced cooling apparatus could also be used. The boxes 29 and 32 in FIG. 7 are the same as in FIG. 6.

In both the method aspects of FIGS. 6 and 7 according to the invention, a conventional scrim 16 may be provided as part of the carpet adjacent the relatively smooth back face 19.

It will thus be seen that according to the present invention a highly advantageous carpet in tile or roll form, and a method of production thereof, have been provided. While the invention has been herein shown and described in what is presently conceived to be the most practical and preferred embodiment thereof, it will be apparent to those of ordinary skill in the art that many modifications may be made thereof within the scope of the invention which scope is to be accorded the broadest interpretation of the appended claims so as to encompass all equivalent structures and methods.

What is claimed is:

1. A method of producing a carpet in tile or roll form using an open mesh fiber reinforced foam layer with foam nodules comprising the steps of:

(a) producing a carpet in tile or roll form having a primary backing through which carpet fiber bundles are tufted and a precoat locking the tufts in place to prevent easy extraction of individual fibers, so that a tufted fiber face and relatively smooth opposite back face are provided, (b) bringing the open mesh fiber reinforced foam layer with foam nodules into intimate contact with the relatively smooth back face; and (c) adhering the open mesh fiber reinforced foam layer with foam nodules in contact with the relatively smooth back face to provide a carpet tile or roll that is substantially prevented from curling or doming, or curling or doming is significantly reduced by applying a non-fused adhesive formulation comprising PVC copolymer, plasticizer, filler, silicone surfactant, and fumed silica, to the relatively smooth back face, and then after step (b), fusing the adhesive at a maximum temperature of about 310° F. to prevent the collapse of the foam nodules of the open mesh fiber reinforced foam layer.

2. A method as recited in claim 1 wherein step (c) is further practiced by applying as the adhesive formulation about 25–150 parts filler, sufficient silicone surfactant to provide a formulation density below 50 pounds per cubic foot, and sufficient fumed silica to provide a formulation Brookfield viscosity of about 30,000–60,000 centipoise at a spindle speed of 2 rpm.

3. A method as recited in claim 1 wherein step (c) is further practiced by applying a formulation consisting essentially of PVC copolymer, plasticizer, filler, silicone surfactant, and fumed silica.

4. A method as recited in claim 1 wherein step (c) is practiced by practicing step (a) using a fusion oven, and so that the relatively smooth face of the backing has fluid properties as it emerges from the fusion oven; and wherein step (b) is practiced by forcing the open mesh fiber reinforced foam layer with foam nodules into intimate contact with the still fluid portion of relatively smooth back face so that the hot melt backing at least partially envelops the foam nodules to provide a substantially instant bond.

5. A method as recited in claim 4 wherein step (c) is further practiced by providing as at least part of the carpet back a formulation comprising:

| | |
|---|---|
| PVC resin with a K value of 62–75 | 100 parts |
| Plasticizer | 60–100 parts | and substantially devoid of blowing agent.

6. A method as recited in claim 1 wherein step (c) is further practiced by providing as part of the carpet back face PVC resin having a K value between 62–75, and substantially devoid of blowing agent.

7. A method as recited in claim 4 comprising the further step of cooling the carpet with open mesh fiber reinforced foam layer with foam nodules backing.

8. A method as recited in claim 1 wherein step (a) is further practiced to provide a reinforcing scrim as part of the carpet adjacent the relatively smooth back face.

9. A method as recited in claim 4 wherein step (a) is further practiced to provide a reinforcing scrim as part of the carpet adjacent the relatively smooth back face.

10. A method as recited in claim 1 wherein steps (a)–(c) are practiced to produce a carpet tile.

11. A method as recited in claim 10 wherein (c) is practiced substantially without utilization of blowing agent.

12. A method as recited in claim 1 wherein (c) is practiced substantially without utilization of blowing agent.

13. A method as recited in claim 1 wherein the open mesh fiber reinforced foam layer has a substantially flat surface and a surface from which nodules protrude; and wherein (b) is practiced by placing the substantially flat surface in contact with the relatively smooth back of the precoat.

14. A method as recited in claim 1 wherein (b) and (c) are practiced by using an open mesh fiber reinforced foam layer having a weight of about 0.5–2.5 ounces per square foot.

15. A method as recited in claim 14 wherein (b) and (c) are practiced utilizing an open mesh fiber reinforced foam layer has a plurality of foam nodules of various thicknesses, densities, and patterns knit or woven into a network having intermittent openings spaced along the surface thereof in a repeating pattern.

16. A method as recited in claim 1 wherein (b) and (c) are practiced utilizing an open mesh fiber reinforced foam layer has a plurality of foam nodules of various thicknesses, densities, and patterns knit or woven into a network having intermittent openings spaced along the surface thereof in a repeating pattern.

17. A method as recited in claim 10 wherein (b) and (c) are practiced utilizing an open mesh fiber reinforced foam layer has a plurality of foam nodules of various thicknesses, densities, and patterns knit or woven into a network having intermittent openings spaced along the surface thereof in a repeating pattern wherein (c) is practiced substantially without utilization of blowing agent.

18. A method of producing a carpet in tile or roll form using an open mesh fiber reinforced foam layer with foam nodules comprising the steps of:

(a) producing a carpet in tile or roll form having a primary backing through which carpet fiber bundles are tufted and a precoat locking the tufts in place to prevent easy extraction of individual fibers, so that a tufted fiber face and relatively smooth opposite back face are provided;

(b) bringing the open mesh fiber reinforced foam layer with foam nodules into intimate contact with the relatively smooth back face; and (c) adhering the open mesh fiber reinforced foam layer with foam nodules in contact with the relatively smooth back face to provide a carpet tile or roll that is substantially prevented from curling or doming, or curling or doming is significantly reduced by applying a non-fused adhesive formulation comprising 100 parts PVC copolymer, about 50–100 parts plasticizer, about 25–150 parts filler, sufficient silicone surfactant to provide a formulation density below 50 pounds per cubic foot, and sufficient fumed silica to provide a formulation Brookfield viscosity of about 30,000–60,000 centipoise at a spindle speed of 2 rpm, to the relatively smooth back face, and then after step (b), fusing the adhesive at a maximum temperature of about 310° F. to prevent the collapse of the foam nodules of the open mesh fiber reinforced foam layer.

19. A method as recited in claim 18 wherein step (c) is further practiced by applying a formulation consisting essentially of PVC copolymer, plasticizer, filler, silicone surfactant, and fumed silica.

20. A method as recited in claim 18 wherein step (c) is practiced by practicing step (a) using a fusion oven, and so that the relatively smooth face of the backing has fluid properties as it emerges from the fusion oven; and wherein step (b) is practiced by forcing the open mesh fiber reinforced foam layer with foam nodules into intimate contact with the still fluid portion of relatively smooth back face so that the hot melt backing at least partially envelops the foam nodules to provide a substantially instant bond.

* * * * *